Patented Feb. 13, 1940

2,189,949

UNITED STATES PATENT OFFICE 2,189,949

STERILIZING COLLOID MATERIALS

Carroll L. Griffith and Lloyd A. Hall, Chicago, Ill., assignors to The Griffith Laboratories, Inc., Chicago, Ill., a corporation of Illinois No Drawing. Application October 31, 1938, Serial No. 238,081

1 Claim. (Cl. 21—58)

The present invention relates to the sterilization of normally dry colloid materials having useful viscosity, or gelling characteristics, and water absorbing capacity, such as gums, gelatin, agar agar and the like. In referring to these materials we consider them as having the forms in which they are commercially available, such as the shreds of agar agar, ribbons or powder of gum tragacanth, dried natural Irish moss, the powders of gum arabic, India gum, locust bean gum, and the sheets, powder or granules of gelatin, and the many starches, flours and meals, dextrin, pectin and the like.

These materials normally carry micro-organic life, such as bacteria, molds and yeasts, usually in latent form because the materials are dry. Such materials are used extensively in food and medicinal preparations, cosmetics and in other ways where the micro-organisms may eventually produce spoilage. Therefore it is desirable that such products be sterilized, and even sterile.

We have found that it is not easy to sterilize these materials and to preserve those special characteristics for which the materials are frequently used. While we know that the material can be treated with ethylene oxide gas as a sterilizing agent, to kill the micro-organisms, we have determined that this may be done under conditions which alter the material. But we have also found that we can use ethylene oxide gas as a sterilizing agent under conditions which do not seriously injure the material, so that the sterilized materials may be used in the normal way.

It is the object of the present invention to sterilize colloid materials such as gums, agar-like substances, and gelatins, by the action of substantially undiluted ethlyene oxide without material loss of the desirable characteristics of the colloid material for many ordinary and special uses.

We have determined that exposure to an atmosphere of substantially undiluted ethlyene oxide gas at ordinary atmospheric pressure and at a temperature of 70° F. for over 5 hours will produce noticeable degradation of gums and other materials above referred to. Therefore, where we aim to sterilize such materials with ethlyene oxide gas we use a shorter time of not more than 3½ hours. We have also found that increased temperature hastens the degradation. Where the material is heated to temperatures over 115° F. in the presence of ethlyene oxide for periods over 2½ hours, there is change in the viscosity characteristics, or gelling characteristics, or in the water absorbing capacities, or in all of these. For example, gums lose in viscosity, starches increase in water absorbing capacity, and pectin and gelatin lose in gelling property. As the temperature is lessened the time can be prolonged. It therefore appears that the process, so far as injury to the material is concerned may be carried on at 70° F. for from 3 to 5 hours, and at 115° F., for not more than 2½ hours.

However, the process must also be predicated on the killing of micro-organisms. From a long series of studies in sterilization of these and other things with ethlyene oxide gas, we have determined that molds and yeasts are quite readily killed, and that bacterial contamination is always so resistant that only the bacterial count (where bacteria are present) is necessary to determine the efficiency of sterilization. We have also found that the efficiency varies somewhat with the different materials. For example, where gum tragacanth may be 80% sterilized, other gums are 96% sterilized, by the same procedure. A simple procedure for low degrees of sterilization involves (1) atmospheric temperature of 70° F., (2) quick preliminary evacuation merely to remove air so that it may be replaced by ethlyene oxide, especially the air between particles of the mass, (3) admission of ethlyene oxide gas to atmospheric pressure, and (4) exposure to the gas for 3 hours. With the same procedure and by increasing the temperature to 100° F., all the gums are about equally sterilized at 99% efficiency. The quality of the gums is not injured.

Further explanation of the invention follows illustrative examples, in which the raw material is as follows:

| Material | Bacteria per gram | Mold per gram |
|---|---|---|
| Gum tragacanth | 17,200 | None |
| Gum karaya | 77,350 | 29,120 |
| Locust bean gum | 2,000 | 20 |
| Irish moss | 34,750 | None |

*Example 1*

The above materials were placed in a vault, evacuated quickly to 23 inches to remove air. Then ethylene oxide gas at a concentration of 1 lb. per 35 cu. ft. of vault space was admitted, which reduced the vacuum to 19 inches. The exposure to gas was continued for 1 hour at 90° F. for the contents of the vault. The results are given below in Table 1.

Example 2

Under substantially the same procedure, except that temperature was 92° F. and time was 2 hours, (noting that vacuum dropped from 20 inches to 16 inches in the two hours), the results are given below in Table 1.

Example 3

The material was evacuated to 22° inches, and 3½ lbs. ethlyene oxide per 35 cu. ft. was admitted at 90° F. for exposure for 3 hours. Vacuum dropped in this time from 14 inches to 11½ inches. The results are given in Table 1.

*Table 1*

| Material | Example No. | Pounds gas per 35 cu. ft. | Time exposure | Percent kill bacteria | Percent kill mold |
|---|---|---|---|---|---|
| Gum tragacanth | 1 | 1 | 1 | 66.5 | 100 |
| Do | 2 | 1 | 2 | 60.4 | 100 |
| Do | 3 | 3½ | 3 | 78.84 | 100 |
| Gum karaya | 1 | 1 | 1 | 92.94 | 99.69 |
| Do | 2 | 1 | 2 | 90.00 | 97.50 |
| Do | 3 | 3½ | 3 | 97.70 | 99.07 |
| Locust bean gum | 1 | 1 | 1 | 92.75 | 100 |
| Do | 2 | 1 | 2 | 87.50 | 100 |
| Do | 3 | 3½ | 3 | 96.00 | 100 |
| Irish moss | 1 | 1 | 1 | 97.84 | 100 |
| Do | 2 | 1 | 2 | 94.40 | 100 |
| Do | 3 | 3½ | 3 | 99.20 | 100 |

Table 1 shows clearly that gum tragacanth is the more difficult to sterilize, although it has a lower bacterial count than Irish moss. The latter is still in its vegetable form and hence more easily penetrated. Examples 1 and 2 show that at the given concentration of gas, the extra hour has little effect. This indicates the probability that in two hours only the surface and near-surface contamination has been reached by the gas. The increased concentration and longer time of Example 3 show a jump in the efficiency, due no doubt to deeper penetration. As shown above, increased temperature effects this also.

In general, a high degree of sterilization may be obtained by subjecting the dry colloid material to an atmosphere of substantially undiluted ethylene oxide gas at a concentration of at least 1 lb. per 35 cu. ft. at a temperature from 110° to 115° F., and preferably not over 110° F. for safety, for not more than 2½ hours at 115° F., or for about 3 hours for the preferred temperature of 110° F. The present invention contemplates the necessity for limiting the sterilizing treatment so as not to injure the material. It is also concerned with securing a high degree of sterilization, of say 99%, within the permitted maximum. The extent to which sterilization falls below perfection is dependent upon time where other factors remain unchanged. A very short time will give a low degree of sterilization. The present invention aims to cut down the time of action of the gas on the material, and to increase the effectiveness of the gas in any given time, by a preliminary step, as a result of which sterilization to over 99% kill of bacteria is possible.

The use of ethylene oxide as a fumigant is well known, but it is not known to applicants that fumigation with it has been practiced on the colloid materials with which this application is concerned. The present process not only includes those conditions which are sufficient for fumigation, but contemplates that the severity of treatment be such that fumigation of the material if infested, will be complete, and the external bacterial content of the bodies of killed insect life will also be extinct. Whether this time will be 1 hour, more, or less, will depend greatly upon all the variable factors.

We have subjected 100 grain beetles in 4 oz. of corn flour to fumigation with a mixture of 10% ethylene oxide and 90% carbon dioxide, for 30 minutes at room temperature at a gas concentration of 1 lb. per 35 cu. ft. First a vacuum of 22 inches was drawn, and a vacuum of 3 inches maintained during fumigation. The beetles moved at the end, but on the next morning were all dead. The bodies were macerated with sterile sand in a sterile mortar. They were found to present a bacterial count of 29,376,000 per gram, and a mold count of 77 per gram. These macerated bugs were used to infect one of two like samples of a stock corn flour. Both samples were simultaneously sterilized by a procedure using 1 lb. per cu. ft. of ethylene oxide gas and substantially the same degree of sterility (1030 to 1103 per gram) was obtained in each case. This establishes to our satisfaction that dead insects are a source of bacterial infection, and that such bacteria are at least no harder to kill than normal bacteria in corn flour. The present invention contemplates that insect infestation be killed and that bacteria on the bodies of the killed insects be likewise killed, as well as the bacteria of disintegrated dead insect bodies in the raw material.

The present application is a continuation in part of our copending application Serial No. 145,154, filed May 27, 1937, which was filed as a continuation in part of Serial No. 82,457, filed May 29, 1936, now Patent No. 2,107,697, issued February 8, 1938. In said application the process varies from that above described, in that before the gas is admitted, the material is subjected for a period of time to high vacuum for an activation effect. In the said process of using vacuum first hereinabove described, the time period of exposure to vacuum is only sufficient to effect the vacuum to remove air, for drawing in ethylene oxide without dilution by air or loss of ethylene oxide, as would occur in simply displacing air by ethylene oxide.

The said activation period is conducted at a temperature for the material from 110° F. to 115° F., and at a high vacuum, such as 27 or 28 inches for an hour. These conditions effect a withdrawal of moisture and adsorbed gases, and possibly temporarily activate latent forms of life with the result that to obtain a given kill the time for exposure to ethylene oxide can be considerably shortened from the time required where no such activation is used. Where there is such activation, followed by a gas concentration of 1 lb. per 35 cu. ft. an exposure for at least 2½ hours produces a 99.5% kill of bacteria and 100% kill of molds and yeasts. If the gas concentration is cut to ½ lb. per 35 cu. ft. the kill is not sufficient to establish a count by the procedure used for sterilized products.

The moisture content of the normally "dry" colloid materials is considerable:

|   | Per cent moisture |
|---|---|
| Gum karaya | 13.18 |
| Gum tragacanth | 9.37 |
| Locust bean gum | 10.53 |
| Irish moss | 11.88 |

This moisture is not free water but rather bound water, and is to be distinguished from the use of free water and ethylene oxide gas in combination to effect sterilization as set forth in the U. S. Patent No. 2,075,845 issued to Gross and Dixon.

We claim:

The method of sterilizing normally dry water-dispersible colloid materials with retention of a useful viscosity, gelling, or water-absorption characteristic which comprises subjecting the dry material at a temperature from 110° F. to 115° F. to a high vacuum for at least an hour whereby to remove moisture and removable gases in activation of the material, and then subjecting said material at 110° F. to 115° F. to substantially undiluted ethylene oxide gas at a vault concentration of at least 1 lb. per 35 cu. ft. for a period of from 3 to 2½ hours, the shorter time for the higher temperature, and the longer time for the lower temperature.

CARROLL L. GRIFFITH.
LLOYD A. HALL.